United States Patent [19]

Giller et al.

[11] 3,846,429

[45] Nov. 5, 1974

[54] METHOD OF PRODUCING 5-FLUOROURACIL

[76] Inventors: Solomon Aronovich Giller, ulitsa Pernavas, 10, kv. 76, Riga; Arvid Avgustovich Lazdinsh, ulitsa Mendeleeva, I, kv. 31, Olaine Latviiskoi; Artur Karlovich Veinberg, ulitsa Ludzas, 2.; Dagnia Yanovna Sniker, ulitsa Tserinju, 42, kv. 12, both of Jurmala Latviiskoi; Ivan Ljudvigovich Knunyants, Kotelnicheskaya naberezhnaya, 1/15, kv. 336, Moscow; Lev Solomonovich German, B. Serpukhovskaya ulitsa, 31, korpus 9, kv. 303, Moscow; Natalya Borisovna Kazmina, ulitsa Krasnogo Mayaka, 8, korpus 2, kv. 41, Moscow, all of U.S.S.R.

[22] Filed: Sept. 22, 1971

[21] Appl. No.: 182,840

[52] U.S. Cl. ............................................. 260/260
[51] Int. Cl. ............................................ C07d 51/30
[58] Field of Search ........................... 260/260, 694

[56] References Cited
UNITED STATES PATENTS 3,682,917  8/1972  Knuniants et al. .................. 260/260

OTHER PUBLICATIONS

Hackh's Chemical Dictionary, 4 Edition, page 581, relied upon.

*Primary Examiner*—Donald G. Daus
*Assistant Examiner*—Anne Marie T. Tighe
*Attorney, Agent, or Firm*—Holman & Stern

[57] ABSTRACT

A method of producing 5-fluorouracil which includes the fluorination of uracil with elementary fluorine diluted with an inert gas in a glacial acetic acid medium under hydrodynamic conditions of Re=35,000–45,000 at a temperature of from 15° to 35° until the uracil disappears from the reaction mixture, whereafter said mixture is heated at a temperature of from 90° to 95°C until 5-fluoro-6-acetoxy-dihydrouracil formed during the fluorination disappears therefrom, followed by isolation of the desired product. The 5-fluorouracil compound is useful as a chemotherapeutical remedy for treating cancer of the alimentary tract and also as a starting material for synthesizing other antitumoric substances.

5 Claims, No Drawings

METHOD OF PRODUCING 5-FLUOROURACIL

The present invention relates to a method of producing 5-fluorouracil which is useful as a chemotherapeutical remedy for treating cancer of the alimentary tract and also as a starting material for synthesizing other antitumouric substances.

Known in the art is a method of producing 5-fluorouracil, comprising fluorination of a diluted uracil suspension in glacial acetic acid (1.2 g in 100 ml) with elementary fluorine diluted with nitrogen at a volumetric ratio of 1:5 at a rate of the gaseous mixture supply of 0.1–0.15 l/hr. per g. of uracil for a period of 12–15 hours followed by isolation of the resulting desired product by vacuum distillation of acetic acid and recrystallizing the residue from water. The yield of the desired product is 52–55 percent by weight of the theoretical value (see Belgian Patent No. 748,468).

This prior-art method has a disadvantage residing in a low process efficiency caused by a strong dilution of the starting material, long duration of the process (up to 12–15 hours) a low yield of the desired product (52–55 percent by weight of the theoretical value).

It is an object of the present invention to eliminate said disadvantages.

It is, therefore, a specific object of the invention to improve the efficiency of the process, reduce the duration thereof and increase the yield of the desired product by modifying the process technology and selecting corresponding operation conditions.

The said object has been accomplished in that in a method of producing 5-fluorouracil by fluorination of uracil with elementary fluorine diluted with an inert gas in a glacial acetic acid medium followed by isolation of the desired product, the reaction according to the invention is effected under hydrodynamic conditions of Reynolds No. $Re = 35,000$–$45,000$ at a temperature of from 15° to 35°C until the uracil disappears from the reaction mixture, whereafter said mixture is heated at a temperature of 90°–95°C until 5-fluoro-6-acetoxy-dihydrouracil resulting from the fluorination disappears therefrom, followed by isolation of the desired product.

In order to improve the process efficiency, it is preferred that uracil be employed in an amount of 7–8 g. per 100 ml of glacial acetic acid.

Nitrogen can be advantageously employed as the inert gas. It is advisable to dilute the elementary fluorine with nitrogen at a volumetric ratio of 1:2.0–2.5. To intensify the process, the gas mixture is supplied at a rate of 1.2–1.5 l/hr. per gram of uracil until fluorine is traced in the off-gases, whereafter the rate of the gas supply is decreased to 0.15–0.18 l/hr. per gram of uracil until the uracil disappears from the reaction mixture.

The method according to the invention may be embodied as follows:

Glacial acetic acid and uracil are charged into a stainless steel reactor which is preferably of an isometric type provided with a circulation pipe. It is advisable to use uracil in an amount of 7–8 g. per 100 ml of glacial acetic acid.

Fluorine diluted with an inert gas, preferably nitrogen, at a volumetric ratio of 1:2.0–2.5 is introduced into said mixture under intensive hydrodynamic conditions of $Re = 35,000$–$45,000$. The gas mixture is supplied at a rate of 1.2–1.5 l/hr. per gram of uracil until fluorine is traced in the off-gases and then at a rate of 0.15–0.18 l/hr. until the uracil disappears from the reaction mixture. Fluorination of uracil is effected at a temperature of 15°–35°C for a period of 1.2–1.5 hours until the disappearance of the uracil from thereaction mixture, which can be detected by different checking methods, for instance, by paper chromatography. The reaction mixture is then heated at a temperature of 90°–95°C for approximately 45 minutes until 5-fluoro-6-acetoxy-dihydrouracil resulting from the fluorination disappears therefrom (which is also detected by the abovementioned checking method). Thereafter the reaction mixture is cooled to room temperature, whereupon 5-fluorouracil precipitates and is collected and washed with ether. The filtrate is evaporated to isolate 5-fluorouracil remaining therein.

The yield of the desired product is 80–84 percent by weight of its theoretical value.

The method according to the invention permits the use of elevated concentrations of starting materials and the increase of the rate of the fluorine-nitrogen gas mixture supply whereby the process duration is 8–10 times reduced and the quantity of acetic acid is reduced by approximately 7 times.

The yield of the desired recrystallized product is increased from 52–55 percent by weight (as in the prior art method) to 80–84 percent by weight of its theoretical value, whereas the production output from a unitary volume of the equipment per unit time is increased by 75 times.

The method of producing 5-fluorouracil according to the present invention is further illustrated by the following example of its embodiment.

EXAMPLE 300 ml of glacial acetic acid and 21.6 g of uracil were under intensive hydrodynamic conditions ($Re=40.000$), charged into a reactor. A fluorine-nitrogen gas mixture at a ratio of 1:2.14 was introduced into the resulting uracil suspension at the rate of 27.5 l/hr. until fluorine was traced in the off-gases and then at the rate of 3.4 l/hr. until the uracil disappeared from the reaction mixture. The temperature was in the range of the process: 20°–25°C. Control method for uracil identification in the reaction mixture - paper chromatography (system: ethylacetate — 90 percent formic acid-water at respective ratios of 65:5:5; paper type FILTRAK FN-11, uracil $R_f=0.30$–$0.33$).

The fluorination lasted for 1.5 hours. Thereafter the reaction mixture was heated at a temperature of 90°–95°C until the resulting 5-fluoro-6-acetoxy-dihydrouracil was completely converted into 5-fluorouracil. The heating time was 45 minutes. A control method similar to the above-mentioned method employed was to determine the conversion of 5-fluoro-6-acetoxy-dihydrouracil (5-fluoro-6-acetoxy-dihydrouracil $R_f = 0.82$–$0.85$. 5-fluorouracil $R_f=0.48$–$0.50$). Afterwards the reaction mixture was cooled to 20°C whereupon 5-fluorouracil was precipitated. It was filtered and washed with a small amount of ether to yield 18.8 g of the product. An additional amount of 4.2 g was obtained on evaporating the filtrate.

The product was recrystallized from water (1:10–11) treated with activated charcoal, dried at a temperature of 60°–70°C, whereafter 19.3 g of pure 5-fluorouracil were obtained. When using the mother liquor the yield of pure 5-fluorouracil was 21.4 g, i.e. 84 percent by weight of its theoretical value. Melting point: 283°–284°C with decomposition.

IR-spectrum (nyol, cm$^{-1}$): 3,195; 3,150; 3,082; 1,728; 1,670; 1,430; 1,250; 1,225. UV-spectrum:

$\lambda_{max}$ 0.1 HCl 265 nm (E = 7,532); $\lambda_{max}$ 0.01 NaOH 270 nm (E = 4,467).

We claim:

1. A method of producing 5-fluorouracil comprising the steps of fluorinating uracil with elementary fluorine diluted with an inert gas in a glacial acetic acid medium under hydrodynamic conditions of Re = 35,000–45,000 at a temperature of from 15° to 35°C until the uracil disappears from the reaction mixture, heating said mixture at a temperature of from 90° to 95°C until 5-fluoro-6-acetoxy-dihydrouracil formed during the fluorination disappears therefrom and isolating the desired product.

2. A method as claimed in claim 1, wherein uracil is employed for the reaction in an amount of 7–8 g. per 100 ml. of glacial acetic acid.

3. A method as claimed in claim 1, wherein nitrogen is employed as the inert gas.

4. A method as claimed in claim 1, wherein elementary fluorine is diluted with nitrogen at a volumetric ratio of 1:2.0–2.5.

5. A method as claimed in claim 1, wherein the reaction is effected at a rate of the gas mixture supply of 1.2–1.5 l/hr. per 1 g. of uracil until fluorine is traced in the offgases and then at a rate of 0.15–0.18 l/hr. per gram of uracil until the uracil disappears from the reaction mixture.

* * * * *